United States Patent
Alluboyina

(10) Patent No.: US 12,254,182 B2
(45) Date of Patent: Mar. 18, 2025

(54) STORAGE AND ACCESS OF ARRAY OBJECTS

(71) Applicant: Rakuten Symphony, Inc., Tokyo (JP)

(72) Inventor: Ravi Kumar Alluboyina, Santa Clara, CA (US)

(73) Assignee: Rakuten Symphony, Inc., Tokyo (JP)

( * ) Notice: Subject to any disclaimer, the term of this patent is extended or adjusted under 35 U.S.C. 154(b) by 89 days.

(21) Appl. No.: 18/184,410

(22) Filed: Mar. 15, 2023

(65) Prior Publication Data
US 2024/0311008 A1    Sep. 19, 2024

(51) Int. Cl.
*G06F 3/00* (2006.01)
*G06F 3/06* (2006.01)

(52) U.S. Cl.
CPC ............ *G06F 3/061* (2013.01); *G06F 3/0638* (2013.01); *G06F 3/0673* (2013.01)

(58) Field of Classification Search
CPC ....... G06F 3/061; G06F 3/0638; G06F 3/0673
See application file for complete search history.

(56) References Cited

U.S. PATENT DOCUMENTS

2019/0026317 A1\* 1/2019 Todd .................... G06F 12/0871
2022/0100426 A1\* 3/2022 Kashiwagi ............ G06F 3/0604

\* cited by examiner

*Primary Examiner* — Tyler J Torgrimson
(74) *Attorney, Agent, or Firm* — David R. Stevens; Stevens Law Group

(57) ABSTRACT

A payload object, such as a JSON object, includes a plurality of elements is converted to an array file by individually serializing the elements. A header is written to the array file that includes the number of elements and an offset to the start of each element of the serialized elements. The serialized elements are written after the header. Thereafter, an individual serialized elements is read by first reading the offset corresponding to the individual serialized element from the header and reading data starting at the offset.

16 Claims, 6 Drawing Sheets

STORAGE AND ACCESS OF ARRAY OBJECTS

BACKGROUND

Field of the Invention

This invention relates to the storage and access of array objects.

Background of the Invention

Communication between application instances is often performed by exchanging objects in standardized formats, especially where the application instances are on different computing devices connected by a network. One common object format is the JAVASCRIPT object notation (JSON) format.

SUMMARY OF THE INVENTION

A system includes a computing device including one or more processing devices and one or more memory devices operably coupled to the one or more processing devices. The one or more memory devices store executable code that, when executed by the one or more processing devices, causes the one or more processing devices to receive a payload object comprising a plurality of deserialized elements. The plurality of deserialized elements are individually serialized to obtain a plurality of serialized elements. An array file is written to a persistent storage device coupled to the one or more processing devices, the array file including a header including a number of the plurality of serialized elements. The plurality of serialized elements are written to the array file after the header.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
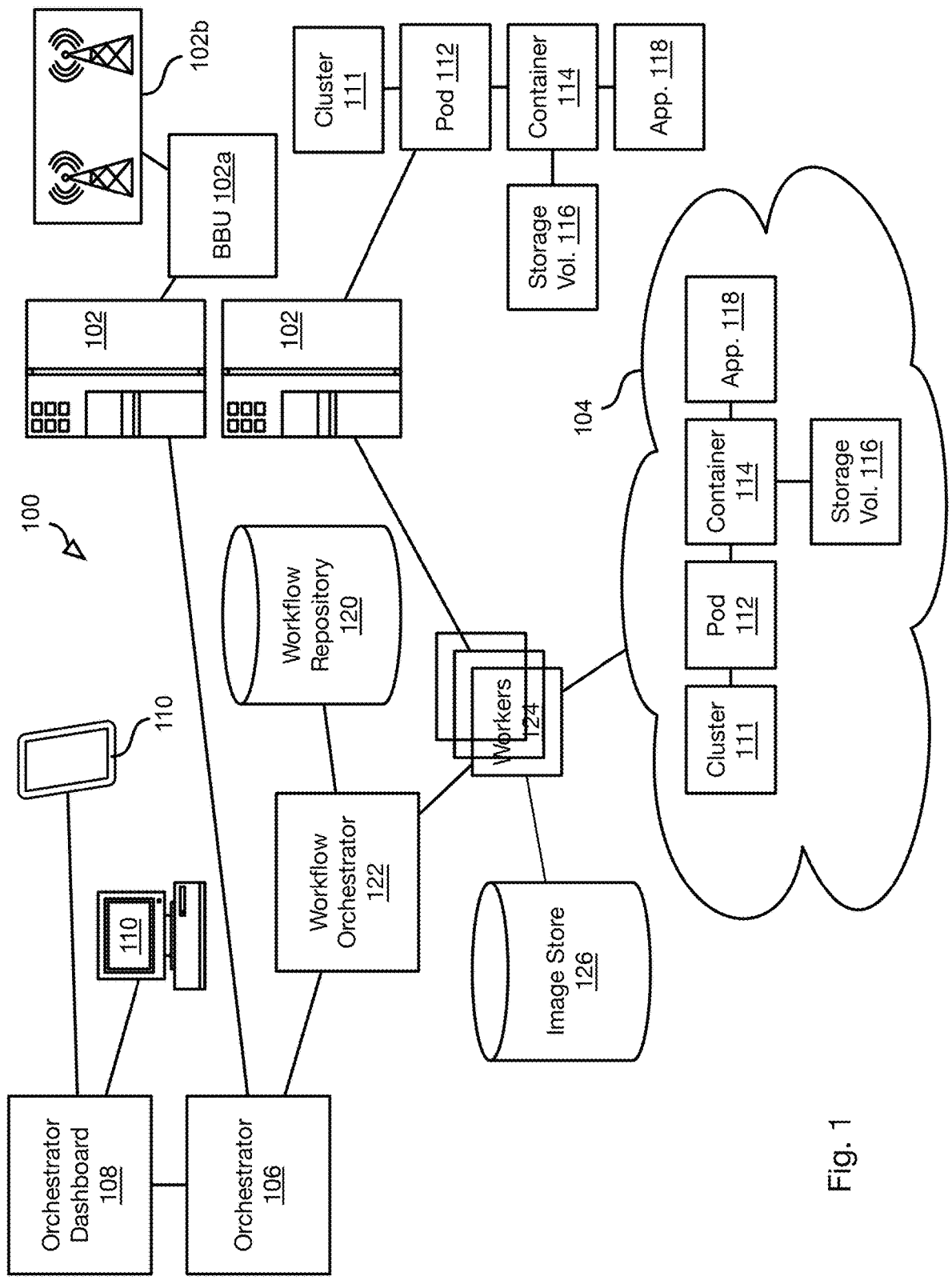
FIG. 1 is a schematic block diagram of a network environment in which payload objects may be transferred in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 600 of FIG. 6.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
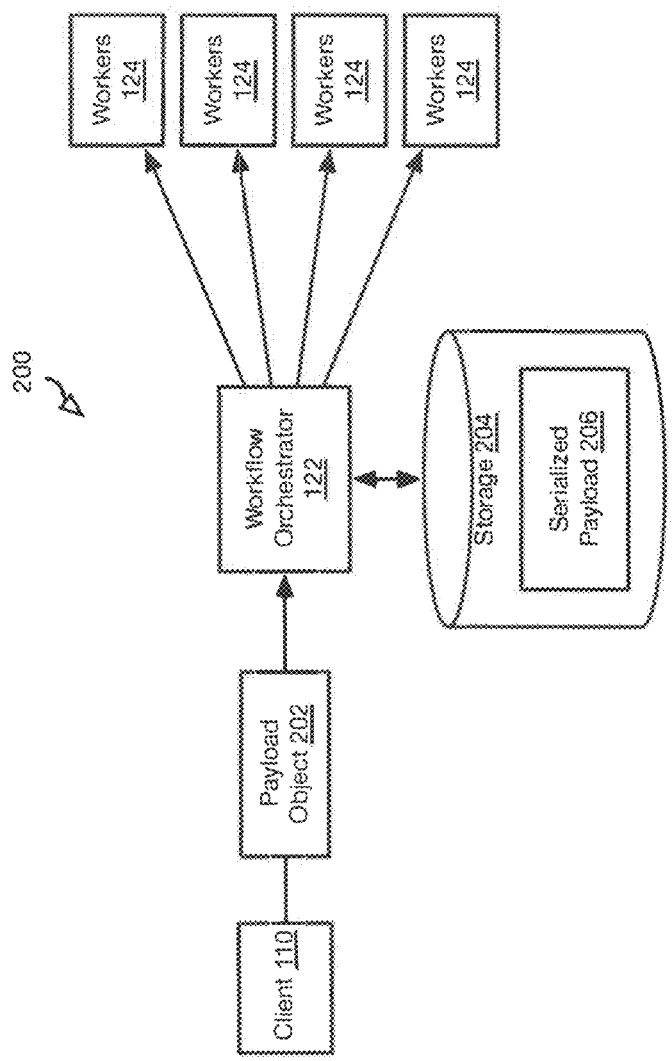
FIG. 2 is a schematic block diagram showing the use of payload objects for assigning tasks to workers in accordance with an embodiment.

Referring to FIG. 2, a client 200, such as the orchestrator 106 or some other component, may transmit a payload object 202 to the workflow orchestrator 122. The payload object 202 may be embodied as a JSON object or some other object format for exchanging data between components. The payload object 202 may include a plurality of elements, such as many thousands, tens of thousands, hundreds of thousands, or more elements. Each element may describe a task to be assigned to a worker 124 and may include an executable (or a reference to an executable) and one or more parameters defining the task. Each element may include one or more key value pairs or data in some other format.

The workflow orchestrator 122 may receive many payload objects 202 from one or more clients 200. The collective size of payload objects 202 currently being processed or waiting for processing may be larger than the memory of the computing device hosting the workflow orchestrator 122. Accordingly, payload objects 202 may be stored in persistent storage 204, e.g., a hard disk drive, NAND flash storage device, or other persistent storage device and then loaded into memory as needed.

In a conventional approach, a payload object 202 is stored in persistent storage 204 in a serialized form. The payload object 202 is serialized by converting the payload object 202 into a serialized payload 206, which is a set of data words of uniform size (e.g., bytes) that can be stored in persistent storage. The serialized payload 206 includes sufficient information such that the set of data words can later be deserialized to convert the stream of data words into the original payload object 202.

To access an element from the payload object 202, such as in response to a request from a worker 124 for assignment of a task, the serialized payload 206 is read from storage 204 into memory and deserialized to obtain the payload object 202, which is also stored in the memory. An element is then read from the payload object 202 using functions defined for the payload object 202. For example, the element may be referenced by an index and the element of the payload object 202 may be retrieved by calling a function of the payload object 202 and passing the index to the function. The retrieved element may then be processed for some purpose, such as by passing the element to a worker 124 for performing a task defined by the element.

At some point, the payload object 202 will be overwritten in the memory to make space for a second payload object 202. Although it is possible that multiple elements will be retrieved while the payload object 202 is in the memory, the process of reading into memory and deserializing the payload object 202 will typically need to be repeated many times before all of the elements of the payload object 202 is completed, which causes a high degree of latency to process the payload object 202.

Figure 3:
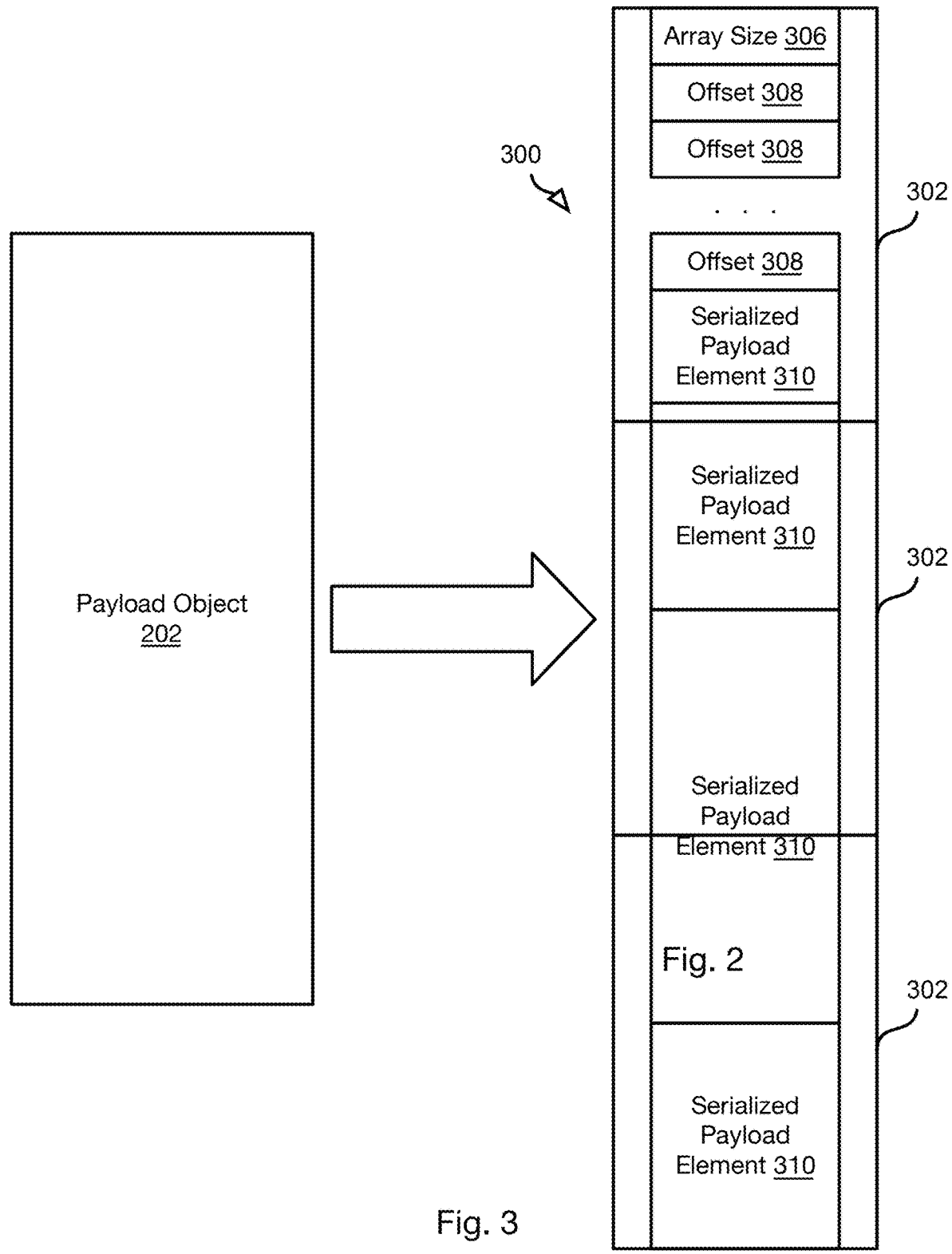
FIG. 3 is a diagram illustrating an array file stored on a storage device in accordance with an embodiment of the present invention.

Referring to FIG. 3, a payload object 202 may be converted to an array file 300 and accessed according to the methods described below with respect to FIGS. 4 and 5. The array file 300 may be stored in one or more pages 302 of the storage 204. A page 302 is the smallest unit of memory that can be individual read from and written to the storage 204. For example, a page 302 may be 4 kilobytes, 8 kilobytes, or some other size. The first data written to the array file 300 is an array size 306. The array size 306 records the number of elements in the payload object 202. The second data written to the array file 300 after the array size 306 are offsets 308. Each offset 308 indicates the starting address of a serialized payload element 310 of a plurality of serialized payload elements stored after the offsets 308. For example, the first offset 308 refers to the starting address of the first data word of the first serialized payload element 310 following the offsets 308, the second offset 308 refers to the starting address of the first data word of the second serialized payload element 310 following the offsets 308, and so on. The array size 306 and offsets 308 are collectively referred to herein as the "header" of the array file 300.

Each serialized payload element 310 is obtained by individually serializing an element of the payload object 202. Each serialized payload element 310 includes sufficient information to recreate a deserialized element of the payload object 302. Each serialized payload element 310 may therefore be read individually from storage 204 in order to recover the deserialized payload element corresponding to the serialized payload element 310.

As shown in FIG. 3, a serialized payload element 310 may be written across multiple pages 302. Likewise, a single page 302 may include all or part of multiple serialized payload element 310. Accordingly, although the entire array file need not be read to obtain a deserialized element of the payload object 202, multiple serialized payload elements 310 may still be read into memory in order to access a single serialized payload element 310, though still much less than the entirety of the serialized payload object 202.

Figure 4:
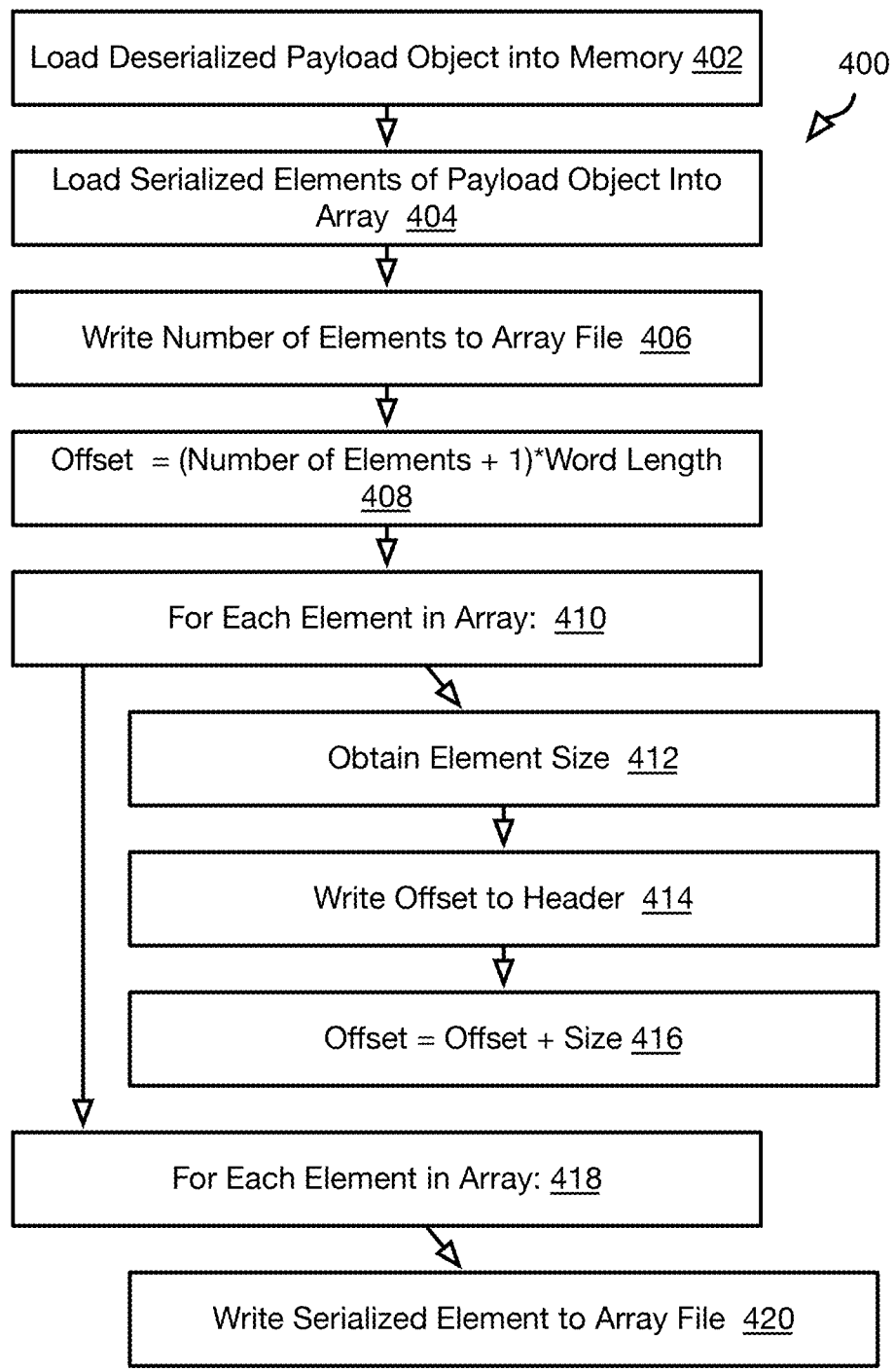
FIG. 4 is a process flow diagram of a method for converting a payload object into an array file in accordance with an embodiment.

FIG. 4 illustrates a method 400 for creating the array file 300. The method 400 may be performed by the computing device implementing the workflow orchestrator 122. The method 400 includes loading 402 a deserialized payload object 202 into memory. Step 402 may be performed as a consequence of receiving a serialized payload 206 over a network. The serialized payload 206 may be received as a stream of data words that are stored in a buffer upon receipt. The serialized payload 206 may then be deserialized at step 402 and stored in the buffer or in the memory, which may be a separate memory device from the buffer. Alternatively, step 402 may include retrieving a serialized payload 206 from storage 204 and deserializing the serialized payload 206 to obtain the deserialized payload object 202.

The method 400 may include loading 404 serialized elements of the payload object 202 into an array. Objects, such as payload objects 202 define attributes and functions for accessing the elements thereof. For example, attributes such as a number of elements, and functions such as serializing the deserialized payload object 202 or an individual element of the deserialized payload object 202. Executables for implementing functions of the payload object 202 may be part of the payload object 202 or retrieved from a library available on the computing device executing the method 400.

For example, let "Array" be the array into which the serialized elements are loaded, let "DP" be the deserialized payload, and let "payload_element" be an index to a deserialized element DP and have values from 0 to N−1, where N is the number of elements in the deserialized payload object 202. Example pseudo code for implementing step 404 may therefore be:

For each payload_element in DP, Array.append(DP.serialize(payload_element))

This pseudo code statement describes using a serialize function of the payload object 202 (DP) to individually serialize each individual element in the payload object 202 and further describes appending each serialized element to the array (Array). This pseudo code statement is exemplary only and other operations may be used to add each serialized element to Array.

The method 400 may include writing 406 the number of elements in the payload object 202 to an array file. The array file may be created and opened as part of step 406. The number of elements may be retrieved from the deserialized payload object 202, e.g., calling a function of DP (e.g., DP.numElements( )) that returns the number of elements in DP. The number of elements may be written as a data word (e.g., one byte) at the first position of payload data within the array file.

The method 400 may include setting 408 an initial value of a variable "Offset" to be equal to the size of the header, which is the combined size of the data words storing the array size 306 and all of the offsets 308, i.e., the word length of the data words multiplied by the sum of the number of elements and one. The initial value of Offset may therefore point to a location in the array file immediately following the header.

The method 400 may then include looping 410 through each element in Array. For example, for each element in Array, the method 400 may include obtaining 412 the element size of each element. For example, let "processed_elements" be a value between 0 and N−1, where N is the number of elements in Array. Step 412 may include calling a function of Array for each value of processed_elements, where the function returns the size of an element referenced by a parameter passed to the function. Step 412 assumes the possibility that the serialized elements stored in Array have non-uniform sizes that are not all the same.

The method 400 may include, for each element in Array, writing 414 the current value of offset to the header followed by incrementing 416 Offset by the element size of each element. Accordingly, data words 2 to N in the array file will therefore store the starting position in the array file of the serialized elements 310 written to the array file.

For example, steps 410-416 may be implemented according to the following pseudo code:

```
For each processed_elements from 0 to N − 1:
    Size = Array.Size(processed_elements);
    Array_file.write(Offset);
    Offset = Offset + Size;
```

The method 400 may then include again looping 418 through each element in Array and writing 420 each element in Array to the array file. The elements may be written in order of indexes of the elements. The elements of Array are serialized such that the length obtained at step 412 will match the length of the serialized elements 310 written at step 420. Accordingly, data words 1 to N in the array file will store the starting position in the array file of the serialized elements 310 written to the array file at step 420.

Figure 5:
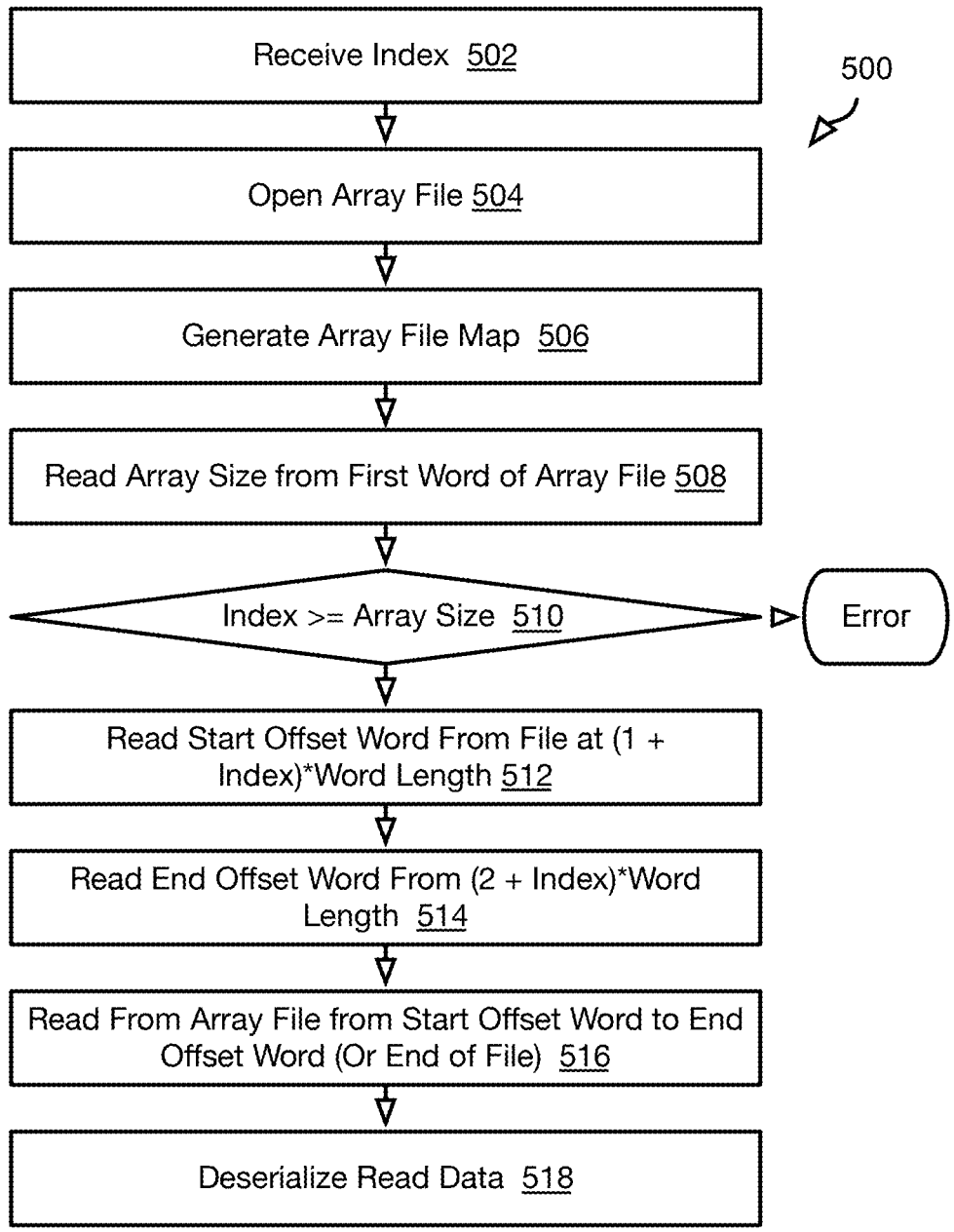
FIG. 5 is a process flow diagram of a method for reading elements from an array file in accordance with an embodiment.

FIG. 5 illustrates a method 500 for reading an element ("the subject element") from the array file in storage 204. The method 500 may include receiving 502 an index. The array file may be opened 504 and a map of the array file may be generated 506. Generating 506 the map of the array file may include calling an operating system function such as the MMAP function in UNIX-based operating system. Generating 506 the map of the array file generates a mapping between offsets in the array file and pages 302 within storage 204 such that, for any given offset, the page 302 within storage 204 storing the data word at that offset can be identified from the mapping. The result of generating 506 the map may be a buffer object ("Buffer") the functions and attributes of which may be used to read from arbitrary offsets within the array file, e.g., Buffer.read(A:B), where A and B are starting and ending bit positions or data word positions defining a range of data to be read from the array file.

The method 500 may include reading 508 the array size 306 from the array file, i.e., the first data word of the header. The method 500 may include evaluating 510 whether the index received at step 502 is less than the array size. If not, the method 500 ends by returning an error. If so, the method 500 may include reading the offsets for the element corresponding to "index," where "index" is the index received at step 502, and the offset for the element corresponding to index+1.

For example, the method 500 may include reading 514 the offset located at (1+index)*Word Length, where Word Length is the length of the data words used to store data in the storage 204, e.g. 1 byte, where 1 is added to the index to account for the array size written to the first word of the array file. The offset 308 read at step 514 is the Start Offset. The method 500 further includes reading 516 the offset 308 located at (2+index)*Word Length as the End Offset. Where the index is the last index (e.g., N−1), then the end offset is not used and the data is simply read to the end of the array file.

The method 500 then includes reading 516 data from the array file beginning at Start Offset and ending at End Offset, i.e., the last data word before End Offset. Reading from the array file may be performed using the object Buffer generated at step 506. The data read at step 516 is the serialized payload element 310 corresponding to the index from step 502. The data read at step 516 may then be deserialized 518 to obtain the deserialized element corresponding to the index from step 502.

The method 500 may be accompanied by background actions of the computing device executing the method 500. The data read at step 516 may be read from one or more pages of storage read into memory as part of step 516 and which may remain cached in memory and available for other iterations of the method 500, such as where the one or more pages storage multiple serialized payload elements 310. The deserialized element from step 518 may be returned to a process that invoked the method 500 and provided the index.

The method 500 may be performed in a like manner for multiple indexes, e.g., a range of indexes including a start index and an end index. Accordingly, the index used at step 512 may be the start index and the index used at step 512 may include the end index. Step 518 would include deserializing the multiple serialized payload elements 310 with the boundaries between serialized payload elements 310 determined by reading the offsets 308 for each index in the range of indexes from the array file.

The method 400 and 500 are described with respect to a workflow orchestrator 122. However, the methods 400 and 500 may be used to process payload objects 202 for any collection of payload elements that need to be processed individually, such as any context in which sharding or batch processing is performed.

As is readily apparent, the methods 400 and 500 reduce the amount of reading from storage 204 required to obtain an element of a payload object 202 from storage as compared to prior approaches that require reading of the entire serialized payload object. Likewise, the amount of memory required to store the deserialized payload elements is reduced relative to storing the entire payload objected 202. However, the methods 400 and 500 also provide improved latency and resource utilization compared to other possible alternatives.

For example, suppose that each serialized payload element 310 were stored as an individual file with the index of the serialized payload element 310 being mapped to the name of the file. Since payload elements 310 have arbitrary lengths and the storage 204 can only write in units of pages (e.g., 4 kilobytes, 8 kilobytes, etc.), it will often occur that an entire page is only partially utilized. For example, a few bytes from a serialized payload element 310 could be the only data written to an entire page. In addition, the storage required define the file in a directory structure adds additional storage utilization. Reading will require reading of a directory and opening and closing of a file for each serialized payload element 310 that is read, which adds latency relative to the method 500.

In another alternative, each serialized payload element 310 may be stored as a row in a database. However, databases likewise have minimum block size resulting in wasted storage space. Databases also maintain indexes that will add to storage utilization. Reading from a database adds additional latency required to prepare a query, parse the query, optimize the query, and execute the query. Buffers used by the database when responding to a query will also increase memory utilization.

Figure 6:
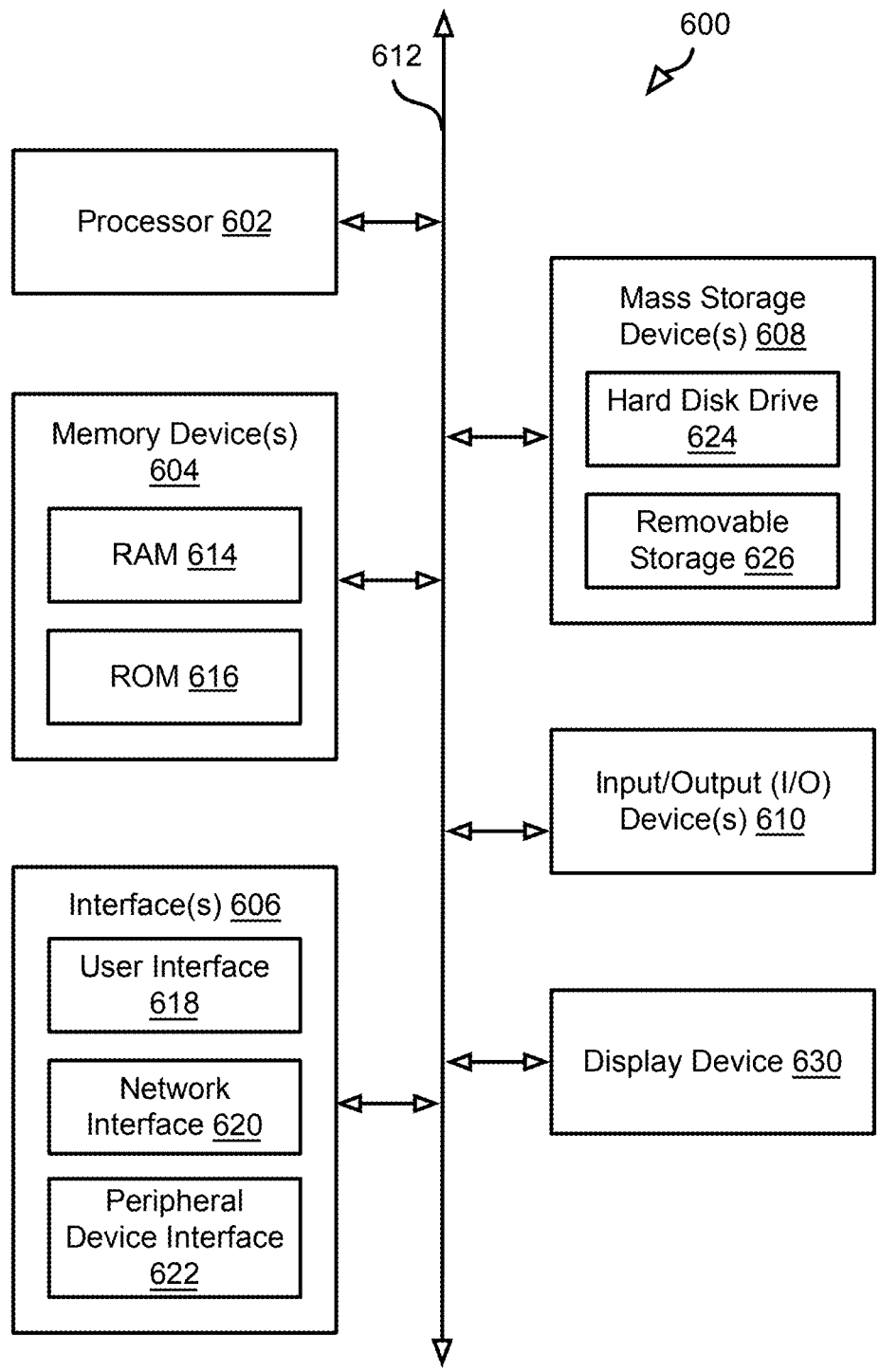
FIG. 6 is a schematic block diagram of an example computing device suitable for implementing methods in accordance with embodiments of the invention.

FIG. 6 is a block diagram illustrating an example computing device 600. Computing device 600 may be used to perform various procedures, such as those discussed herein. The servers 102, orchestrator 106, workflow orchestrator 122, and cloud computing platform 104 may each be implemented using one or more computing devices 600. The orchestrator 106, and workflow orchestrator 122 may be implemented on different computing devices 600 or a single computing device 600 may execute both of the orchestrator 106, and workflow orchestrator 122.

Computing device 600 includes one or more processor(s) 602, one or more memory device(s) 604, one or more interface(s) 606, one or more mass storage device(s) 608, one or more Input/output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, I/O device(s) 610, and display device 630 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising:
a computing device including one or more processing devices and one or more memory devices operably coupled to the one or more processing devices, the one or more memory devices storing executable code that, when executed by the one or more processing devices, causes the one or more processing devices to:
receive a payload object comprising a plurality of deserialized elements;
individually serialize the plurality of deserialized elements to obtain a plurality of serialized elements;
write an array file to a persistent storage device coupled to the one or more processing devices, the array file including a header including a number of the plurality of serialized elements; and
write the plurality of serialized elements to the array file after the header;
wherein the executable code, when executed by the one or more processing devices, further causes the one or more processing devices to write a plurality of offsets to the header after the number of the plurality of serialized elements, each offset of the plurality of offsets pointing to a starting position of a serialized element of the plurality of serialized elements upon writing to the array file based on sizes of the plurality of serialized elements;
wherein the executable code, when executed by the one or more processing devices, further causes the one or more processing devices to:
initialize an offset variable to a word length multiplied by a sum of one and the number of the plurality of serialized elements; and
process each element of the plurality of serialized elements in order by:
(a) writing the offset variable to the array file; and
after (b), incrementing the offset variable by a size of each element.

2. The system of claim 1, wherein the sizes of the plurality of serialized elements include a plurality of different sizes.

3. The system of claim 1, wherein the executable code, when executed by the one or more processing devices, further causes the one or more processing devices to:
receive an index;
open the array file;
read a starting offset of the plurality of offsets corresponding to the index from the array file;
read an ending offset of the plurality of offsets corresponding to the index plus one from the array file;
read data from the array file from the starting offset up to the ending offset;
deserialize the data to obtain a deserialized object; and
store the deserialized object in the one or more memory devices.

4. The system of claim 3, wherein the executable code, when executed by the one or more processing devices, further causes the one or more processing devices to:
generate a map that maps offset positions within the array file to pages in the persistent storage device; and
use the map to read the data from the array file from the starting offset up to the ending offset.

5. The system of claim 4, wherein the executable code, when executed by the one or more processing devices, further causes the one or more processing devices to:
write the plurality of serialized elements to the array file after the header by writing the plurality of serialized elements to the pages in the persistent storage device with at least one page of the pages storing multiple elements of the plurality of serialized elements.

6. The system of claim 1, wherein the executable code, when executed by the one or more processing devices, further causes the one or more processing devices to:
store the plurality of serialized elements in an array stored in the one or more memory devices.

7. The system of claim 1, wherein the payload object is a JAVASCRIPT object notation (JSON) object.

8. The system of claim 1, wherein each deserialized element of the plurality of deserialized elements defines a task to be performed by a worker.

9. A method comprising:
receiving, by a computing device, a payload object comprising a plurality of deserialized elements;
individually serializing, by the computing device, the plurality of deserialized elements to obtain a plurality of serialized elements;
writing, by the computing device, an array file to a persistent storage device, the array file including a header including a number of the plurality of serialized elements;
writing, by the computing device, the plurality of serialized elements to the array file after the header;
writing, by the computing device, a plurality of offsets to the header after the number of the plurality of serialized elements, each offset of the plurality of offsets pointing to a starting position of a serialized element of the plurality of serialized elements upon writing to the array file based on sizes of the plurality of serialized elements;
initializing, by the computing device, an offset variable to a word length multiplied by a sum of one and the number of the plurality of serialized elements; and
processing, by the computing device, each element of the plurality of serialized elements in order by:
(a) writing the offset variable to the array file; and
after (b), incrementing the offset variable by a size of each element.

10. The method of claim 9, wherein the sizes of the plurality of serialized elements include a plurality of different sizes.

11. The method of claim 9, further comprising:

receiving, by the computing device, an index;

opening, by the computing device, the array file;

reading, by the computing device, a starting offset of the plurality of offsets corresponding to the index from the array file;

reading, by the computing device, an ending offset of the plurality of offsets corresponding to the index plus one from the array file;

reading, by the computing device, data from the array file from the starting offset up to the ending offset;

deserializing, by the computing device, the data to obtain a deserialized object; and storing, by the computing device, the deserialized object in one or more memory devices.

12. The method of claim 11, further comprising:

generating, by the computing device, a map that maps offset positions within the array file to pages in the persistent storage device; and using, by the computing device, the map to read the data from the array file from the starting offset up to the ending offset.

13. The method of claim 12, further comprising:

write the plurality of serialized elements to the array file after the header by writing the plurality of serialized elements to the pages in the persistent storage device with at least one page of the pages storing multiple elements of the plurality of serialized elements.

14. The method of claim 9, further comprising storing, by the computing device, the plurality of serialized elements in an array stored in one or more memory devices.

15. The method of claim 9, wherein the payload object is a JAVASCRIPT object notation (JSON) object.

16. The method of claim 9, wherein each deserialized element of the plurality of deserialized elements defines a task to be performed by a worker.

* * * * *